United States Patent [19]

Korchynsky et al.

[11] E Re. 28,878

[45] Reissued June 22, 1976

[54] HIGH-STRENGTH LOW-ALLOY STEELS

[75] Inventors: Michael Korchynsky; John David Grozier; John L. Mihelich, all of Bethel Park, Pa.; John R. Bell, Grosse Isle, Mich.; Leon Luyckx, McMurray, Pa.

[73] Assignee: Jones & Laughlin Steel Corporation, Pittsburgh, Pa.

[22] Filed: Nov. 11, 1974

[21] Appl. No.: 522,527

Related U.S. Patent Documents

Reissue of:

[64] Patent No.: 3,666,452
Issued: May 30, 1972
Appl. No.: 842,345
Filed: July 16, 1969

[52] U.S. Cl. ..... 75/123 E; 75/123 J; 148/12 F; 148/12.4; 148/36

[51] Int. Cl.[2] ..... C22C 38/06; C22C 38/12; C21D 7/14

[58] Field of Search ..... 148/12, 36; 75/123 B, 75/123 N, 123 J, 123 E

[56] References Cited

UNITED STATES PATENTS

| | | | |
|---|---|---|---|
| 3,010,822 | 11/1961 | Altenburger et al. | 75/123 |
| 3,102,831 | 9/1963 | Tisdale | 148/12 |
| 3,494,808 | 2/1970 | Goda et al. | 148/12 |
| 3,539,404 | 11/1970 | De Retana | 148/12.4 |

FOREIGN PATENTS OR APPLICATIONS

| | | | |
|---|---|---|---|
| 1,084,231 | 9/1967 | United Kingdom | 148/12 |

*Primary Examiner*—W. Stallard
*Attorney, Agent, or Firm*—Buell, Blenko & Ziesenheim

[57] ABSTRACT

Fully killed high-strength low-alloy steels consisting essentially of .12% to .20% carbon, 1.10% to 1.65% manganese, .05% to .20% vanadium, .005% to .025% nitrogen, .04% maximum phosphorus, .025% maximum sulfur, .60% maximum silicon and balance iron are characterized in a hot-rolled finished condition by yield strengths in excess of 80,000 p.s.i., ultimate tensile strengths in excess of 95,000 p.s.i., ductilities as measured by percent elongation (2 inches) in excess of 18% and good toughness. The steels are hot-rolled finished in the temperature range 1550° F. to 1650° F., cooled at a rate within the range 20° F. to 135° F. per second and collected by coiling or piling within a temperature range of 1025° F. to 1175° F. The steels modified by the incorporation of .01% to .10% of a rare earth are further characterized by improved formability.

6 Claims, No Drawings

HIGH-STRENGTH LOW-ALLOY STEELS

Matter enclosed in heavy brackets [ ] appears in the original patent but forms no part of this reissue specification; matter printed in italics indicates the additions made by reissue.

This invention relates to high-strength low-alloy steels and their method of manufacture.

To achieve commercial acceptance, a high-strength low-alloy steel in addition to having high strength should also have good formability, toughness, weldability and fatigue resistance. We have developed low-alloy steels which through a unique combination of chemistry and processing parameters possess these properties to an extent and in a balance not heretofore available in hot-rolled finished material. It has been necessary to heat treat hot-rolled low-alloy steels to obtain the properties possessed by the steels of the invention in a hot-rolled state.

Accordingly, an object of the present invention is to provide low-alloy steels having high strength in combination with excellent formability, toughness, weldability and fatigue resistance. Another object of the present invention is to provide such steels characterized in a hot-rolled finished condition by a yield strength in excess of 80,000 p.s.i., an ultimate tensile strength in excess of 95,000 p.s.i., ductility as measured by percent elongation (2 inches) in excess of 18% and superior toughness. Still another object of the present invention is to provide such steels which can be bent without cracking about an inside radius which is equal or less than the thickness of the steel.

These and other objects and advantages of the present invention will become apparent from the following detailed description thereof.

The steels of the present invention are fully killed and have the following preferred chemistry: carbon, .12% to .20%; manganese, 1.10% to 1.65%; vanadium, .05% to .20%; nitrogen, .005% to .025%; phosphorus, .04% maximum; sulfur, .025% maximum; silicon, .60% maximum; rare earth, 0 to .10%; iron, balance.

The steels, to possess the desired characteristics and properties of a yield strength in excess of 80,000 p.s.i., an ultimate tensile strength in excess of 95,000 p.s.i., ductility as measured by percent elongation (2 inches) in excess of 18% and superior toughness, are hot-rolled finished in the temperature range 1550° F. to 1650° F., and collected as by coiling or piling within a temperature range of 1025° F. to 1175° F. For the typical length of a modern hot-mill run-out table and conventional rolling speeds, the steel must be cooled at a rate within the range of 20° F. to 135° F. per second to maintain the finishing and coiling temperature specified.

The significance of processing the steels within a finishing temperature range of 1550° F. to 1650° F. and a coiling temperature of 1025° F. to 1175° F. is demonstrated in Table I.

TABLE I

| Heat No. | Chemistry (weight percent) C | Mn | Si | V | Al | N | P | S | Thermal practice | Finishing temperature, °F. | Coiling temperature, °F. | Yield strength (p.s.i.) | Ultimate tensile strength (p.s.i.) | Percent elongation (2") |
|---|---|---|---|---|---|---|---|---|---|---|---|---|---|---|
| 797138 | .15 | 1.30 | .45 | .10 | .020 | .019 | .007 | .011 | High | 1,700 | 1,290 | 70,700 | 80,200 | 25.5 |
| | | | | | | | | | Within | 1,650 | 1,100 | 80,200 | 97,600 | 25.5 |
| 803769 | .13 | 1.38 | .44 | .088 | .024 | .015 | .008 | .010 | Low | 1,600 | 1,000 | 90,500 | 119,000 | 11.0 |
| | | | | | | | | | Within | 1,650 | 1,100 | 85,600 | 104,000 | 25.0 |

Material from Heat No. 797138 subjected to a high thermal practice, i.e., finished at a temperature above 1650° F. and coiled at a temperature above 1175° F. exhibited a yield strength and ultimate tensile strength below that exhibited by material from the same heat finished and coiled within the specified range. Material from Heat No. 803769 finished at a temperature within the specified range but coiled at a temperature below 1175° F., while possessing a high yield strength and ultimate tensile strength, exhibited low ductility as measured by percent elongation (2 inches). Material from the same heat processed completely within the temperature ranges of the invention demonstrated markedly superior ductility.

The importance of maintaining the steel chemistry within that set out above is shown in Table II.

TABLE II

| Heat No. | Chemistry (weight percent) C | Mn | Si | V | Al | N | P | S | Finishing temperature, °F. | Coiling temperature, °F. | Yield strength (p.s.i.) | Ultimate tensile strength (p.s.i.) | Percent Elongation (2") |
|---|---|---|---|---|---|---|---|---|---|---|---|---|---|
| 4347 | .16 | 1.01 | .04 | .10 | .022 | .004 | .010 | .020 | 1,650 | 1,100 | 66,500 | 89,800 | 26.5 |
| 4391-1 | .18 | 1.19 | .37 | .03 | .057 | .012 | .007 | .020 | 1,650 | 1,100 | 57,400 | 77,400 | 29.0 |
| 43233 | .17 | 1.50 | .53 | .07 | .16 | .021 | .007 | .012 | 1,650 | 1,120 | 98,600 | 116,000 | 26.5 |

The heats of Table II were all processed within the specified temperature ranges of the invention. Heat No. 4347 contained only .004% nitrogen and had a yield strength and ultimate tensile strength substantially below the desired strength levels. Heat No. 4391-1 contained vanadium below the minimum of .05% specified above and also had a yield strength and ultimate tensile strength significantly below the desired level. Heat No. 43233 contained vanadium in an amount near the upper limit employed by the steels of the invention and demonstrated a yield strength and ultimate tensile strength significantly above the specified minimum of 80,000 p.s.i. At the same time, the ductility of the steel, as measured by percent elongation (2 inches), was 26.5.

The effect of the thermal processing parameters on the impact properties of the steels is also significant. This can be seen from Table III.

the formation of substantially spherically-shaped inclusions which retain their spherical shape in the hot-rolled product. The improved formability of such steels is shown in Table IV.

TABLE III

| Heat No. | Chemistry (weight percent) C | Mn | P | S | Al | Si | V | N | Finishing temperature, °F. | Coiling temperature, °F. | Test directon | Impact properties: Transition temperature, °F. 50% shear | 10 ft.-lbs. | Energy absorbed at room temperature (ft.-lbs.) |
|---|---|---|---|---|---|---|---|---|---|---|---|---|---|---|
| 797566 | .17 | 1.50 | .007 | .012 | .07 | .53 | .16 | .021 | 1,650 | 750 | Longitudinal | +35 | −100 | 40 |
| | | | | | | | | | | | Transverse | +20 | (1) | 10 |
| 806558 | .18 | 1.05 | .004 | .011 | .045 | .39 | .089 | .021 | 1,660 | 1,300 | Longitudinal | +50 | −60 | 38 |
| | | | | | | | | | | | Transverse | +20 | +25 | 13 |
| 804982 | .14 | 1.16 | .009 | .011 | [.37] .037 | .056 | .072 | .118 | 1,640 | 1,120 | Longitudinal | −15 | −100 | 62 |
| | | | | | | | | | | | Transverse | 0 | −15 | 18 |

(1) Room temperature

TABLE IV

| Heat No. | Gage | Chemistry (weight percent) C | Mn | Si | S | P | V | Al | N | Ce | Test direction | Impact properties: Shelf energy (ft.-lbs.) | 50% ductile-brittle transfer-temperature (°F) | Minimum bend radius[1] |
|---|---|---|---|---|---|---|---|---|---|---|---|---|---|---|
| 806558 | 0.250" | .17 | 1.11 | .40 | .017 | .008 | .093 | .053 | .019 | — | Longitudinal | 33 | +20 | 2.5T |
| | | | | | | | | | | | Transverse | 12 | +10 | |
| 985297 | 0.250" | .17 | 1.34 | .41 | .008 | .005 | .13 | .077 | .022 | .014 | Longitudinal | 41 | −10 | .75T |
| | | | | | | | | | | | Transverse | 20 | +10 | |

[1] Without cracking transverse sample.

The specimens for which the data of Table III was obtained comprised one-half size Charpy V-notch samples. Heat No. 797566 was coiled at a temperature below the minimum coiling temperature of the invention, 1025° F., while Heat No. 806558 was both finished and coiled above the maximum temperatures of the invention. Heat No. 804982 was finished and coiled within the temperature ranges of the invention. For specimens taken in directions both longitudinal and transverse to the rolling direction, Heat No. 804982 had lower transition temperatures at 50% shear and 10 ft.-lbs. than Heat No. 806558. Heat No. 804982 had lower transition temperatures at 50% shear for both longitudinal and transverse specimens and at 10 ft.-lbs. for the transverse specimen than Heat No. 797566. The longitudinal specimens of the latter two heats had the same transition temperature at 10 ft.-lbs. The energy absorbed by the specimens before fracturing at room temperature (about 70° F.) was greater in all instances for Heat No. 804982.

For applications where the steel is to be subjected to severe forming operations, a rare earth in the amount of a .01% to .10% is added to the steel. Examples of rare earths employed in the invention are cerium, lanthanum, praseodymium, neodymium, yttrium, scandium, or mischmetal which, of course, is a mixture of rare earths. The rare earths may be added in a pure form or in the form of a compound, such as a silicide. To insure good recovery, the rare earth is preferably added to the steel in the ingot mold or in the ladle after the steel has been killed. The use of rare earths result in The improved bending properties of Heat No. 806558 which contained a rare earth (cerium) is demonstrated by the fact that steels from that heat could be bent about an inside radius of a minimum of ¾ of their thickness without cracking, whereas steels from Heat No. 985297 which did not contain any rare earth could only be bent about a minimum inside radius of 2½ times their thickness before cracking. Crack lengths less than 0.10 inch were discounted. The table further shows that the rare earths contribute to improved toughness as measured by the shelf energy.

While a carbon content within the range of .12% to .20% is preferred, lower or higher carbon contents are acceptable depending on the manganese content. As is known, an increase in carbon is accompanied by a decrease in ductility, toughness and weldability so that where an impairment in these properties is acceptable to achieve higher strengths, higher carbon contents are employed. Similarly, while a manganese content of 1.10% to 1.65% is preferred, lower manganese contents can be used. Where corrosion resistance is of importance, copper is added to the steel to improve its atmospheric corrosion resistance. *Broadly stated the composition of this alloy may consist essentially of at least about 0.12% carbon, a maximum of about 1.65% manganese, at least about 0.05% vanadium, 0.005% to 0.025% nitrogen, 0.04% maximum phosphorus, 0.025% maximum sulfur, 0.60% maximum silicon and the balance iron.*

The steels of the invention possess excellent weldability and are highly resistant to either hot or cold cracking. Preheating or postheating of the weld area is not required. In addition, the steels of the invention are often more resistant to fatigue damage than a quenched and tempered alloy steel of the same or even higher yield strength. This is because the steels of the invention are not subjected to heat treating and therefore are virtually free of surface decarburization.

We claim:

1. A killed, low-alloy high-strength steel hot-rolled finished in the temperature range 1550° F. to 1650° F., cooled at a rate within the range 20° F. to 135° F. per second, and collected within a temperature range of 1025° F. to 1175° F., the steel being characterized in a hot-rolled condition by a yield strength in excess of 80,000 p.s.i., an ultimate tensile strength in excess of 95,000 p.s.i., ductility as measured by percent elongation (2 inches) in excess of 18%, and good toughness, said steel consisting essentially of at least about .12% carbon, a maximum of about 1.65% manganese, at least about .05% vanadium, .005% to .025% nitrogen, .04% maximum phosphorus, .025% maximum sulfur, .60% maximum silicon, .01% to .10% of a rare earth or mixture of rare earths, balance iron.

2. The steel of claim 1 containing .12% to .20% carbon, 1.10% to 1.65% manganese and .05% to .20% vanadium.

3. A process for manufacturing a low-alloy high-strength steel characterized in the hot-rolled condition by a yield strength in excess of 80,000 p.s.i., an ultimate tensile strength in excess in about 95,000 p.s.i., ductility as measured by percent elongation (2 inches) in excess of about 18% and good toughness, comprising, hot-rolling a steel consisting essentially of at least .12% carbon, a maximum of about 1.65% manganese, at least about .05% vanadium, .005 to .025% nitrogen, .04% maximum phosphorus, .025% maximum sulfur, .60% maximum silicon, .01% to .10% of a rare earth or mixture of rare earths, balance iron at a finishing temperature within the range of 1550° F. to 1650° F., cooling the hot-rolled product at a rate within the range 20° F. to 135° F. per second and collecting the cooled material at a temperature within the range 1025° F. to 1175° F.

4. The process of claim 3 wherein the steel contains .12% to .20% carbon, 1.10% to 1.65% manganese and .05% to .20% vanadium.

5. A *killed* low-alloy high-strength steel *hot-rolled finished in the temperature range 1550° F. to 1650° F., cooled at a rate within the range 20° F. to 135° F. per second, and collecting within the temperature range of 1025° F. to 1175° F. the steel being characterized in a hot-rolled condition by a yield strength in excess of 80,000 p.s.i., an ultimate tensile strength in excess of 95,000 p.s.i., ductility as measured by percent elongation (2 inches) in excess of 18%, and good toughness*, having improved bending properties and consisting essentially of [ at least ] about .12% *to .20%* carbon, [ a maximum of ] about *1.10% to* 1.65% manganese, at least about .05% vanadium, .005% to .025% nitrogen, .04% maximum phosphorus, .025% maximum sulfur, .60% maximum silicon, .01% to .10% of a rare earth or mixture of rare earths, balance iron.

6. The steel of claim 5 containing [ .12% to .20% carbon, 1.10% to 1.65% manganese and ] .05% to .20% vanadium.

* * * * *